B. FORD.
RETAINER OR SEPARATOR FOR SECONDARY OR STORAGE BATTERIES.
APPLICATION FILED FEB. 8, 1918.

1,376,927.

Patented May 3, 1921.
2 SHEETS—SHEET 1.

WITNESS:

INVENTOR
Bruce Ford
BY
Augustus B. Stoughton
ATTORNEY.

UNITED STATES PATENT OFFICE.

BRUCE FORD, OF PHILADELPHIA, PENNSYLVANIA.

RETAINER OR SEPARATOR FOR SECONDARY OR STORAGE BATTERIES.

1,376,927.   Specification of Letters Patent.   Patented May 3, 1921.

Application filed February 8, 1918. Serial No. 215,984.

*To all whom it may concern:*

Be it known that I, BRUCE FORD, a citizen of the United States, residing at Philadelphia, in the county of Philadelphia and State of Pennsylvania, have invented certain new and useful Improvements in Retainers or Separators for Secondary or Storage Batteries, of which the following is a specification.

The principal objects of the present invention are, first; to provide an improved separator or retainer for storage or secondary batteries of the type consisting of a wall having therein permanently open slits, and second; to provide for the production of such separators or retainers by a departure from and an improvement upon the means for holding the slits open, described in Letters Patent No. 985,045, of February 21st, 1911, to Madden.

The invention, stated generally, consists in slitting a wall of little thickness such as is usually employed for separators or retainers, in rows of generally parallel slits, then enlarging the area of the wall and consequently opening the slits by separating their longer sides in the plane of the wall to the required degree to cause the widened slits to remain open.

The invention also comprises a storage battery separator or retainer consisting of a slitted wall having a permanent open set imparted to its slits by enlargement of its area.

The invention also comprises the improvements to be presently described and finally claimed.

The invention will be described in connection with the accompanying drawings in which—

Figure 1:
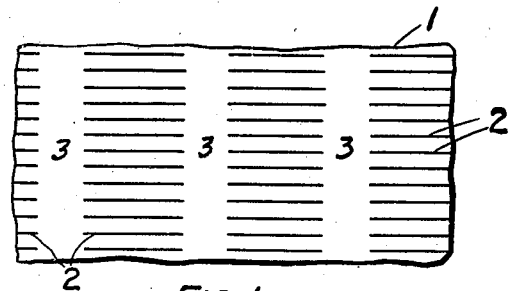
Figures 1 and 2 are a face view and a section of a slitted flat wall prior to the enlargement of its area and the opening of its slits.
Figure 2:
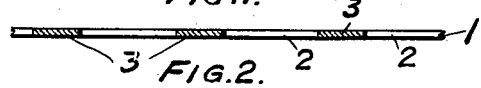
Figure 3:
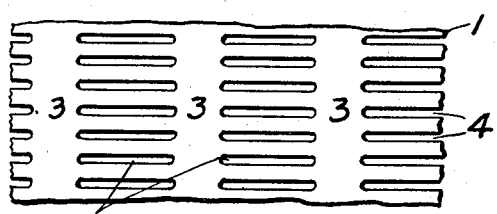
Figs. 3 and 4, are similar views of the wall, as a finished product and after its area has been enlarged and the bars between the ends of the slits of adjacent rows have been elongated.
Figure 4:
Figure 5:
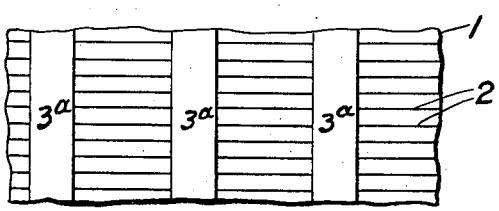
Figs. 5, 6, 7 and 8, are similar views illustrating a modification in which the wall between the rows of slits is initially ribbed and thereafter flush.
Figure 6:
Figure 7:
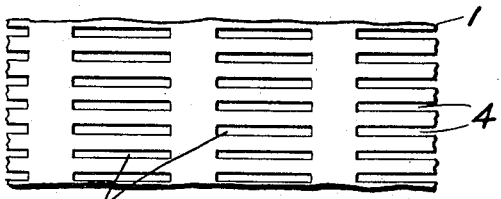
Figure 8:
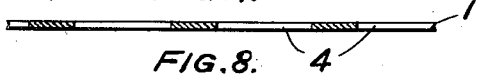
Figure 9:
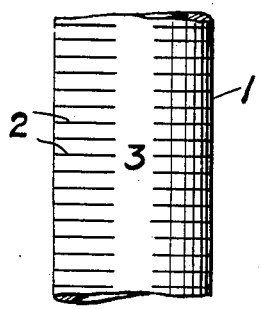
Figs. 9 and 10, are views similar to Figs. 1 and 4, except that the wall is cylindrical instead of flat.
Figure 10:
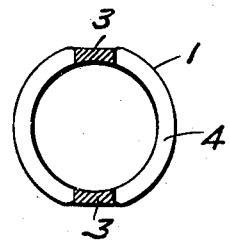
Figure 11:
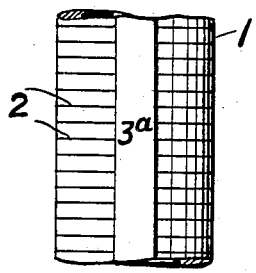
Figure 12:
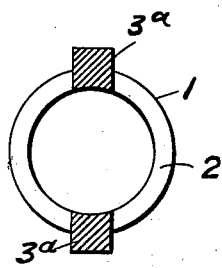
Figure 13:
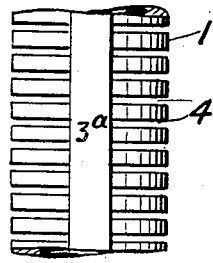
Figure 14:
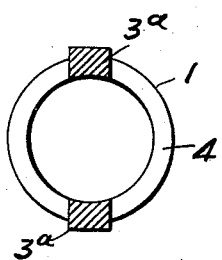

Figs. 11 and 12, are views similar to Figs. 5 and 6, except that the wall is cylindrical, and Figs. 13 and 14, are views of the finished product of Figs. 11 and 12.

In the drawings 1, is a wall of appropriate material capable of having its area increased by compression or stretching and of retaining such increased area. Examples of such material are celluloid, lead and so-called hard rubber. The thickness of the wall is that usually employed for storage battery separators and retainers, and while it may vary in accordance with the size of the plates, it may be said for explanation and not limitation, in the case of hard rubber to be from $\frac{1}{64}$ to $\frac{1}{32}$ of an inch thick. The wall may be generally flat as in Figs. 1 to 8, or generally cylindrical as in Figs. 9 and 14, since separators and retainers of both those forms, as well as of other forms, are well known, and such form is not of the essence of the invention which resides in the wall constituting the separator and retainer, rather than in the shape of the latter. 2, are generally parallel slits, cuts or gashes arranged in rows with unslitted bars between them. The slits or cuts 2, are, for example, of the character described in the Madden patent, but their edges are in the plane of the wall. In Figs. 1, 2, 3, 4, 7, 8, 9 and 10, the bars 3, between the rows of slits are flush or nearly flush with the rest of the surface, but in Figs. 5, 6 and 11 to 14, the bars 3ª, are in the form of ribs projecting beyond the rest of the surface. Whatever the form of the bars they are elongated in the direction of their lengths by increasing the area of the wall in the direction of the length of the bars as by rolling or otherwise stretching the bars. If the bars are initially flush this operation will slightly depress them, forming little channels, but if the bars are initially ribbed on either or both faces of the wall they can be made flush or into the form of smaller ribs. As the bars are rolled down or otherwise stretched, the longer sides of the slits are moved apart in the plane of the wall sufficiently to make openings of the required width. From the above description it will be evident to those skilled in the art that the area of a slitted wall can be readily increased to open the slits by stretching or rolling the wall. Moreover the width of the openings can be accurately determined.

Thereafter the stretch or elongation is permanent and consequently the openings are held open. Evidently no material is bodily removed in the formation of the finished openings 4, although material is caused to change its place. From this it follows that waste of material is avoided. The product is mechanically perfect and the process very simple. Moreover the quality of the finished product is better suited to the purpose for which it is intended than if it were subjected to the violent treatment necessary for physically removing portions of it. The size of the finished openings may be anything desired from very small to comparatively large. The stretching of the bars especially adapts them to holding the slits open under all conditions of use and the area of the wall is increased during manufacture.

What I claim is:

1. The process of making secondary or storage battery separators and retainers, which consists in slitting a wall in parallel rows of parallel slits with unslitted bars between the ends of the slits of adjacent rows and elongating the bars to permanently enlarge the opening of the slits in the plane of the wall, substantially as described.

2. The process of making secondary or storage battery separators and retainers, which consists in cutting a wall in slits with unslitted material between the slits and elongating the material between the slits to permanently enlarge the opening of the slits in the plane of the wall.

3. A separator or retainer for secondary or storage batteries consisting of a wall of material capable of having its area increased by compression or stretching and of retaining such increased area and having therein rows of expanded or dilated slits open in the plane of the walls, substantially as described.

BRUCE FORD.